United States Patent [19]

Long et al.

[11] 4,132,478
[45] Jan. 2, 1979

[54] ILLUMINATION SYSTEM FOR A PHOTOGRAPHIC COPYING APPARATUS

[75] Inventors: John G. Long, Epsom; Nicholas P. Watts, Horley, both of England

[73] Assignee: Durst (U.K.) Limited, Epsom, England

[21] Appl. No.: 813,269

[22] Filed: Jul. 6, 1977

[30] Foreign Application Priority Data

Jul. 26, 1976 [GB] United Kingdom .............. 31057/76

[51] Int. Cl.² ...................... G03B 27/54; G03B 27/76
[52] U.S. Cl. .......................................... 355/71; 355/70
[58] Field of Search ...................... 355/18, 32, 36, 77, 355/35, 37, 38, 67-71

[56] References Cited

U.S. PATENT DOCUMENTS

| 3,217,594 | 11/1965 | Simmon | 355/35 X |
| 3,227,044 | 1/1966 | Hunt et al. | 355/35 X |
| 3,630,609 | 12/1971 | Clapp et al. | 355/37 |
| 3,756,712 | 9/1973 | Weisglass et al. | 355/32 X |
| 3,923,394 | 12/1975 | Frankiewicz | 355/37 |

FOREIGN PATENT DOCUMENTS 840130  1/1939  France ....................................... 355/32

Primary Examiner—Donald A. Griffin
Attorney, Agent, or Firm—Connolly and Hutz

[57] ABSTRACT

A light-diffuser for a photographic copier such as an enlarger incorporates a closely contacting parallel row of elongated glass rods held between a pair of tracks. The rods are preferably of heat-resistant glass of round cross section. An additional row of such rods may be disposed parallel to the first row and staggered therefrom to improve the diffusion of a beam of light passing through them.

13 Claims, 4 Drawing Figures

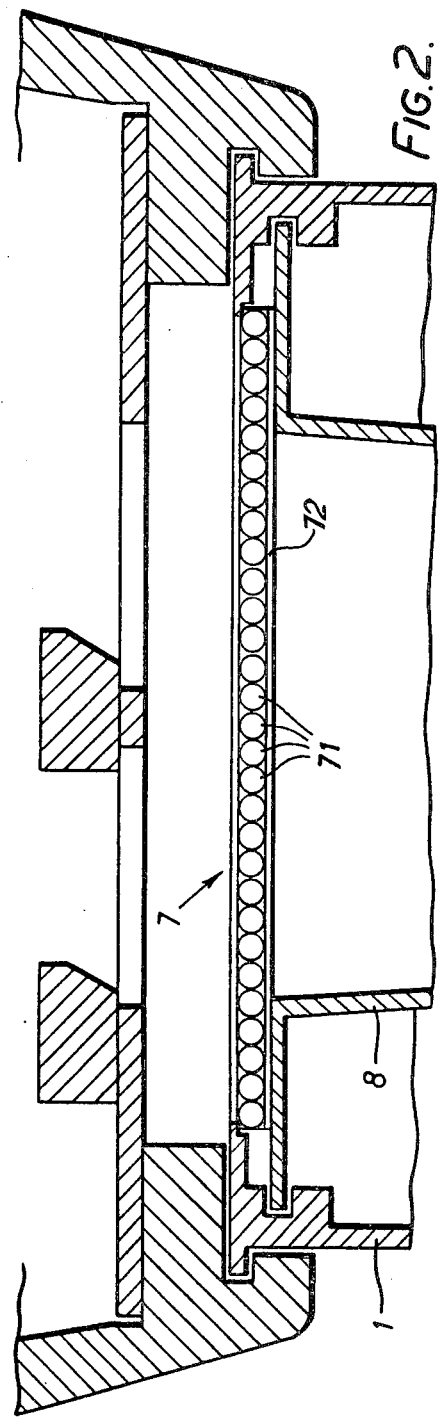
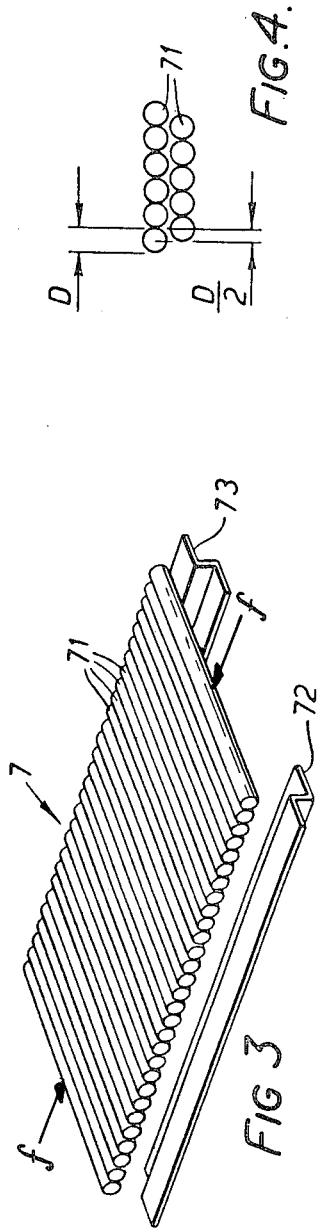
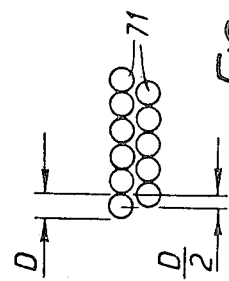

ILLUMINATION SYSTEM FOR A PHOTOGRAPHIC COPYING APPARATUS

BACKGROUND OF THE INVENTION

The invention relates to an illumination system for a photographic enlarging or other copying apparatus.

In enlarging or other copying apparatus in which the image original to be copied is acted on by diffuse light, light-diffusing means is generally necessary to achieve this type of illumination. So-called light-mixing ducts are frequently used in this connection, the inner surfaces of which reflect, or effect diffuse reflection, and which are generally provided, at one position at least, with light-diffusing means occupying completely or partially the cross-sectional area of the light-mixing duct, for example, in the form of a diffuser screen extending over the cross-sectional area. The diffuser screen may be, for example, a ground glass screen. Illumination systems are known in which light-diffusing means in the form of a diffuser screen is provided in the cross-sectional area of such a light-mixing duct either at the end where the light enters or the end where the light leaves.

It is especially important to get good light-mixing with color copiers of certain kinds, that is, when the proportion of the different primary colors in the copying beam is varied by partially inserting a filter into the beam.

Diffuser screens made of plastics material, which have a very good light-mixing action and are easy to fashion, are frequently used in conjunction with light-mixing ducts. Diffuser screens of this kind, however, can be used at the light-entering end of a light-mixing duct only if they are arranged a sufficient distance away from the light source or if the light source only has a low output.

SUMMARY

The invention provides an illumination system for a photograph copying apparatus, which illumination system includes light-diffusing means including a plurality of elongated lens elements of substantially uniform cross-sectional area arranged in the light path transverse to the direction of the light path.

The plurality of lens elements produces a plurality of elongate images of the light source or sources, and this enables good light-mixing and diffusion to be achieved. Also, the use of the plurality of lens elements enables good heat-resisting properties to be achieved.

The lens elements will usually be used with an additional diffusion means so that the multiple images of the source will not be present in the copying beam itself.

Advantageously, the light-diffusing means is arranged in the light path at the light-entering area of a light-mixing duct. Further diffusion means may be arranged at the light-leaving end of the duct.

The lens elements may be formed integrally with each other; for example, they may together form a reeded or fluted screen. It is preferred, however, that the lens elements comprise individual rods. Such rods may be arranged parallel to each other with their lengths co-extensive with each other. The rods may be arranged in a row, the rods being in contact with each other over their lengths. One or more additional rows may be provided above or below the first-mentioned row. For example, an additional row of rods may be provided resting on the first-mentioned row, the rods of the additional row being parallel to each other and to the rods of the first-mentioned row and in contact with each other, but with the axes of the additional rods off-set with respect to those of the first-mentioned row. The cross-sectional area of the rods is preferably circular, but other cross-sections may be employed. Similarly, if desired, rods of different diameter may be used, but it will generally be more convenient to use identical rods.

The lens elements may be formed of plastics material (for example, of a heat-resisting plastics material and/or spaced well apart from the source), but preferably the lens elements are made of glass, preferably of a heat-resisting glass.

The use of a plurality of glass rods is particularly advantageous. Such a light-diffusing means has the capacity to withstand greater thermal stress than glass diffuser screens used hitherto and is thus less liable to be damaged by the heat in the vicinity of the light sources. This allows the light paths to be reduced towards, or to, the minimum structurally possible (which was not possible with prior glass diffuser screens). In addition, a lower loss of light may be produced with the arrangement of the invention as compared with conventional diffuser screens. Furthermore, the method of production of the diffusing means according to the invention can be very simple since glass rods normally available on the market may be used and merely need to be cut to the required length. The rods are preferably made of heat-resistant glass, for example, Pyrex glass, and such rods can also be readily obtained. Pyrex is the trademark for a variety of heat-resistant glasses made and sold by Corning Glass Works, Corning, New York. At least ten, preferably at least twenty, rods or other lens elements are advantageously provided.

One light source, or more than one light source, may be provided for the illumination system.

The invention also provides photographic copying apparatus including an illumination system as hereinbefore described.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 2 is an enlarged cross-sectional view in elevation of a portion of FIG. 1 showing the diffuser of this invention;

FIG. 3 is an exploded three-dimensional view of the light-diffuser shown in FIGS. 1 and 2; and FIG. 4 is a schematic view in elevation of a modification of the light-diffuser of this invention having two parallel rows of elements.

DESCRIPTION OF THE PREFERRED EMBODIMENT

Figure 1:
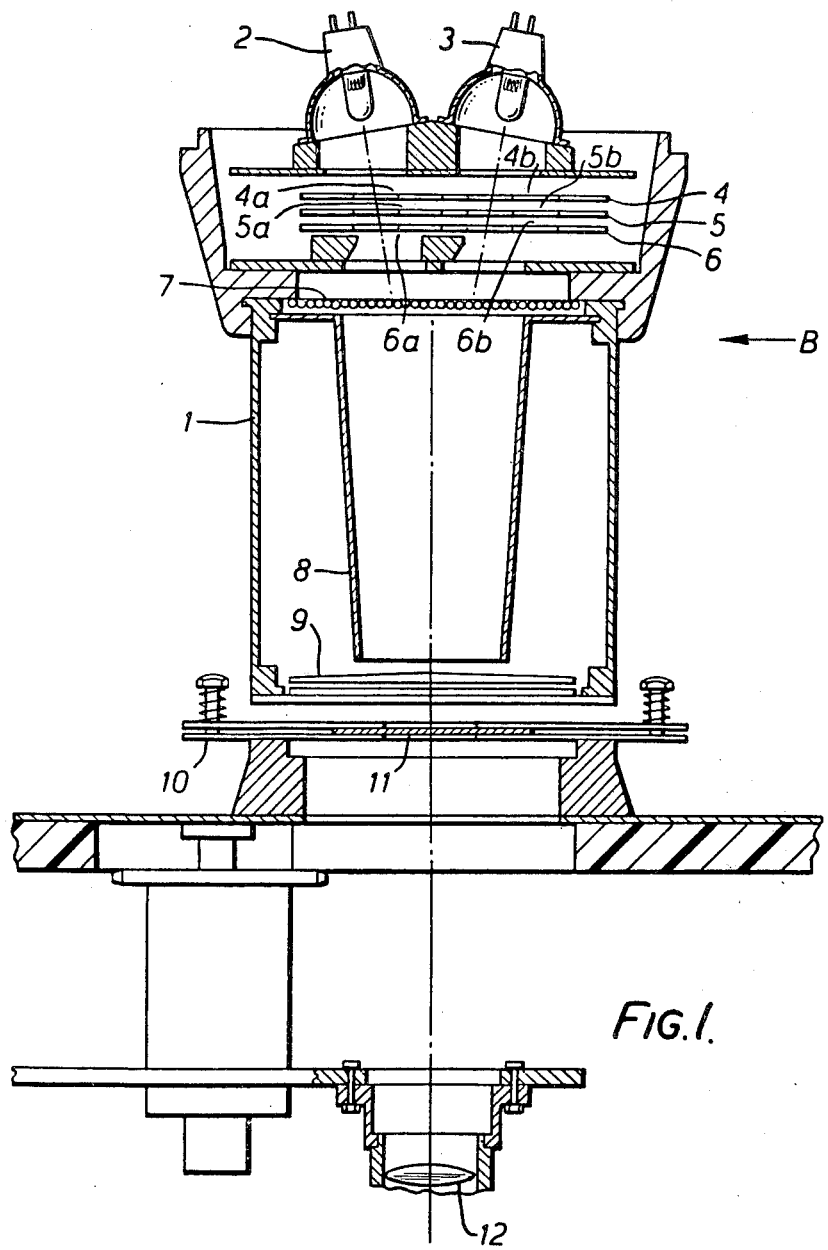
FIG. 1 is a cross-sectional schematic view in elevation of the illuminating system for a photo-copying apparatus which incorporates a diffuser which is one embodiment of this invention.

The illuminating system B forms part of a copying apparatus for transparent color originals. For example, the copying system could be a color enlarger, and the illuminating system the color head. The illuminating system comprises a housing 1 with two light sources 2 and 3, for example, having snapped-on ellipsoidal reflectors. In one focal point of the ellipsoidal reflectors, the filament coils of the respective light source are situated, and in the vicinity of the second focal point, three pairs of filters are arranged situated one behind the other in the light beam, mounted in appropriate filter carriers 4, 5, 6. The filters are in the subtractive primary colors, that is, yellow, magenta and cyan; for example 4a and 4b could be in the filter color yellow, 5a and 5b in the filter color magenta, and 6a and 6b in the filter color cyan. The filters can be inserted in the path of rays from the two light sources.

Below the filter carriers is arranged light-diffusing means 7, to be described in more detail hereinafter, which covers the light entering area of a light-mixing duct 8. The light leaving this duct passes through a diffuser screen 9, the thickness of which may, for example, decrease from the middle to the edges of the cross-sectional covered in order to influence the distribution of intensity of the light over this cross-section. Arranged below the diffuser screen 9 is a carrier 10 for an original, which receives the image originals, for example, a color negative 11, to be copied. By means of a lens 12, which is fixed below the carrier 10, the original is projected onto a projection plane (not shown).

The light-diffusing means 7 at the light entering area of the light mixing duct 8 consists of several cylindrical glass rods 71 arranged next to each other in series. The glass rods may for example, be arranged in two rails 72, 73 (shown in FIG. 3) fixed above the light-mixing duct 8, the mutual position of the rods being maintained, for example, by spring elements (not shown) acting against the outermost glass rods in the direction of arrow f. Even though a wide variety of cross-sectional areas is possible, a circular cross-sectional area is preferred because with this shape no difficulties arise regarding the mutual arrangement of the individual glass rods 71 and the diffusing action is the same whatever the angular positions of the individual rods. It is possible for the diffusing means to consist of two or more layers of glass rods 71, particularly where there is the danger of light passing directly through openings between the rods of a single layer when the surfaces of adjacent glass rods are not exactly parallel. In such a case it is advisable for the individual rods of each layer to be offset with respect to each other by a distance corresponding to half the diameter D/2 of the glass rods, as shown in FIG. 4.

With an arrangement of diffusing means as described above, a much higher resistance to heat is achieved, while the diffusing action is improved in comparison with glass diffuser screens used hitherto.

In order to increase the high thermal resistance further by this arrangement with material homogeneity with respect to conventional diffuser screens, the individual glass rods 71 may be of heat-resistant glass, for example of the type of glass available on the market under the trademark "Pyrex." Since glass rods of this type are already available on the market and do not have to be specially prepared, the production of the diffusing means according to the invention can be very economical.

A convenient diameter of the rods may be ⅛th inch or 5/32nd inch, for example.

The light-diffusing means according to the invention may be used in any kind of enlarging or other copying apparatus in which diffuse light is desired. The light-mixing duct 8 may be dispensed with in some arrangements, although its presence is preferable.

We claim:

1. A light diffuser for a light projecting apparatus having a light source comprising a plurality of elongated lens elements of substantially uniform cross section, a holder for the lens elements disposing them in close contact with each other in a parallel row of transverse disposition in the projected light to diffuse it, and the lens elements each comprise an individual rigid rod whereby the resistance to thermal stress is improved.

2. A light diffuser as set forth in claim 1 wherein the rods have ends and the ends are substantially coextensive.

3. A light diffuser as set forth in claim 1 wherein the holder comprises a pair of parallel rails.

4. A light diffuser as set forth in claim 3 wherein the holder includes means for resiliently pressing the rods in close contact with each other.

5. A light diffuser as set forth in claim 1 wherein the row of lens elements comprise a substantially rectangular array.

6. A light diffuser as set forth in claim 1 wherein a second closely contacting row of elongated rods is provided, and the second row being disposed parallel to the first row with its rods in a staggered arrangement relative to the rods in the first row.

7. A light diffuser as set forth in claim 1 wherein the lens elements each have a substantially circular cross section.

8. A light diffuser as set forth in claim 1 wherein the lens elements comprise glass.

9. A light diffuser as set forth in claim 8 wherein the glass is heat resistant.

10. A light diffuser as set forth in claim 1 wherein at least ten lens elements are provided.

11. A light diffuser as set forth in claim 1 wherein at least twenty lens elements are provided.

12. A light diffuser as set forth in claim 1 wherein the light projector has a light mixing duct having a light entrance, and the light diffuser is disposed in the path of light entering the light entrance.

13. A light diffuser for a light projecting apparatus comprising a plurality of elongated lens elements of substantially uniform cross section, a holder for the lens elements disposing them in close contact with each other in a parallel row for transverse disposition in the projected light to diffuse it, a second row of elongated lens elements are provided, the second row being disposed parallel and closely adjacent to the first row, each of the lens elements having centers, and the centers of the second row being offset substantially midway between the centers of the first row.

* * * * *